(12) United States Patent
Wang

(10) Patent No.: US 12,439,227 B2
(45) Date of Patent: Oct. 7, 2025

(54) RESOURCE CONFIGURATION METHOD, TERMINAL DEVICE, AND NON-TRANSITORY COMPUTER READABLE STORAGE MEDIUM

(71) Applicant: GUANGDONG OPPO MOBILE TELECOMMUNICATIONS CORP., LTD., Guangdong (CN)

(72) Inventor: Shukun Wang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 648 days.

(21) Appl. No.: 17/853,319

(22) Filed: Jun. 29, 2022

(65) Prior Publication Data
US 2022/0329984 A1 Oct. 13, 2022

Related U.S. Application Data

(63) Continuation of application No. PCT/CN2019/130098, filed on Dec. 30, 2019.

(51) Int. Cl.
*H04W 4/06* (2009.01)
*H04B 7/06* (2006.01)
*H04W 16/28* (2009.01)
*H04W 56/00* (2009.01)

(52) U.S. Cl.
CPC .......... *H04W 4/06* (2013.01); *H04B 7/06952* (2023.05); *H04W 16/28* (2013.01); *H04W 56/001* (2013.01)

(58) Field of Classification Search
CPC ..... H04W 4/06; H04W 16/28; H04W 56/001; H04W 72/30; H04W 76/40; H04W 72/23; H04W 56/0015; H04B 7/06952; H04B 7/0695
See application file for complete search history.

(56) References Cited

U.S. PATENT DOCUMENTS

| | | | | |
|---|---|---|---|---|
| 2013/0286924 A1* | 10/2013 | Gao | ................. | H04W 24/02 370/312 |
| 2013/0336189 A1* | 12/2013 | Mandil | ............. | H04W 52/0219 370/312 |

(Continued)

FOREIGN PATENT DOCUMENTS

| | | |
|---|---|---|
| CN | 108282749 A | 7/2018 |
| CN | 110392436 A | 10/2019 |

(Continued)

OTHER PUBLICATIONS

Ericsson, "Uu-based sidelink resource allocation", 3GPP TSG-RAN WG1 Meeting #97 R1-1907135, May 3, 2019 (May 3, 2019).

(Continued)

*Primary Examiner* — Edan Orgad
(74) *Attorney, Agent, or Firm* — PERKINS COIE LLP

(57) ABSTRACT

A resource allocation method includes that: a terminal device receives first configuration information from a network device, where the first configuration information is used for determining a radio resource configuration of a Multimedia Broadcast Multicast Service (MBMS). A terminal device and a non-transitory computer readable storage medium are also provided.

18 Claims, 18 Drawing Sheets

(56) References Cited

U.S. PATENT DOCUMENTS

| | | | |
|---|---|---|---|
| 2014/0140237 A1* | 5/2014 | Ma | H04W 24/08 |
| | | | 370/252 |
| 2018/0192255 A1 | 7/2018 | Guo et al. | |
| 2018/0270893 A1 | 9/2018 | Patel et al. | |
| 2018/0359726 A1* | 12/2018 | Ode | H04W 72/54 |
| 2019/0253966 A1* | 8/2019 | Park | H04W 52/0209 |
| 2019/0306833 A1 | 10/2019 | Tang et al. | |
| 2020/0169998 A1 | 5/2020 | Kim et al. | |
| 2021/0136532 A1* | 5/2021 | Liu | H04W 4/06 |
| 2021/0243567 A1 | 8/2021 | Takano | |
| 2022/0256316 A1 | 8/2022 | Takano | |
| 2025/0106875 A1* | 3/2025 | Xu | H04W 72/0453 |

FOREIGN PATENT DOCUMENTS

| | | |
|---|---|---|
| CN | 111491373 A | 8/2020 |
| IN | 110463299 A | 11/2019 |
| WO | 2019031946 A1 | 2/2019 |
| WO | 2019116703 A1 | 6/2019 |

OTHER PUBLICATIONS

International Search Report in the international application No. PCT/CN2019/130098, mailed on Sep. 27, 2020.
Written Opinion of the International Search Authority in the international application No. PCT/CN2019/130098, mailed on Sep. 27, 2020.
Supplementary European Search Report in the European application No. 19958125.7, mailed on Nov. 11, 2022. 9 pages.

\* cited by examiner

A terminal device receives first configuration information from a network device, the first configuration information being used for determining a radio resource configuration of an MBMS ⟵ 801

FIG. 8

RESOURCE CONFIGURATION METHOD, TERMINAL DEVICE, AND NON-TRANSITORY COMPUTER READABLE STORAGE MEDIUM

CROSS-REFERENCE TO RELATED APPLICATION

This application is a U.S. continuation application of International Application No. PCT/CN2019/130098, entitled "RESOURCE ALLOCATION METHOD AND APPARATUS, TERMINAL DEVICE AND NETWORK DEVICE", filed on Dec. 30, 2019, the disclosure of which is hereby incorporated by reference in its entirety.

TECHNICAL FIELD

The present disclosure relate to the technical field of mobile communications, and more particularly, to a method for resource configuration, a terminal device, and a non-transitory computer readable storage medium.

BACKGROUND

A Multimedia Broadcast Multicast Service (MBMS) is a technology for transmitting data from one data source to multiple users through sharing network resources. The technology can effectively utilize network resources while providing multimedia services to realize broadcast and multicast of multimedia services with a higher rate (e.g., 256 kbps).

In New Radio (NR) systems, many scenarios require service requirements that support multicast and broadcast, such as in Internet of Vehicles, Industrial Internet, and so on. Therefore, it is necessary to introduce the MBMS into NR. It is necessary to clarify how to configure radio resources for the MBMS.

SUMMARY

Embodiments of the present application provide a method and apparatus for resource configuration, a terminal device, and a network device.

The embodiments of the disclosure provide a method for resource configuration, which includes the following operation.

A terminal device receives first configuration information from a network device, where the first configuration information is used for determining a radio resource configuration of an MBMS.

The embodiments of the disclosure provide a method for resource configuration, which includes the following operation.

A network device transmits first configuration information to a terminal device, where the first configuration information is used for determining a radio resource configuration of an MBMS.

The embodiments of the disclosure provide an apparatus for resource configuration, which is applied to a terminal device and includes a receiving unit.

The receiving unit is configured to receive first configuration information from a network device, where the first configuration information is used for determining a radio resource configuration of an MBMS.

The embodiments of the disclosure provide an apparatus for resource configuration, which is applied to a network device and includes a transmitting unit.

The transmitting unit is configured to transmit first configuration information to a terminal device, where the first configuration information is used for determining a radio resource configuration of an MBMS.

The embodiments of the disclosure provide a terminal device, which includes a processor and a memory. The memory is configured to store a computer program, and the processor is configured to call and run the computer program stored in the memory to execute the method for resource configuration described above.

The embodiments of the disclosure provide a network device, which includes a processor and a memory. The memory is configured to store a computer program, and the processor is configured to call and run the computer program stored in the memory to execute the method for resource configuration described above.

The embodiments of the disclosure provide a chip, which is used to achieve the method for resource configuration described above.

Specifically, the chip includes a processor. The processor is configured to call a computer program from a memory and run the computer program, to cause a device mounted with the chip to execute the method for resource configuration described above.

The embodiments of the disclosure provide a computer readable storage medium. The computer readable storage medium is used to store a computer program that causes a computer to execute the method for resource configuration described above.

The embodiments of the disclosure provide a computer program product, which includes computer program instructions that cause a computer to execute the method for resource configuration described above.

The embodiments of the disclosure provide a computer program. The computer program, when running on a computer, causes the computer to execute the method for resource configuration described above.

According to the above technical solution, a method for radio resource configuration of the MBMS is provided, to enable the NR system to support radio resource allocation of the MBMS and ensure effective transmission of the MBMS.

BRIEF DESCRIPTION OF THE DRAWINGS

The drawings described herein are intended to provide a further understanding of the present disclosure and form a part of the present disclosure. The schematic embodiments of the present disclosure and the description thereof are intended to explain the present disclosure and do not constitute an improper limitation of the present disclosure. In the drawings:

FIG. 8 is a flowchart of a method for resource configuration according to an embodiment of the present disclosure.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the present disclosure may be applied to various communication systems, such as a Long Term Evolution (LTE) system, an LTE Frequency Division Duplex (FDD) system, an LTE Time Division Duplex (TDD) system, a 5G communication system or a future communication system.

Figure 1:
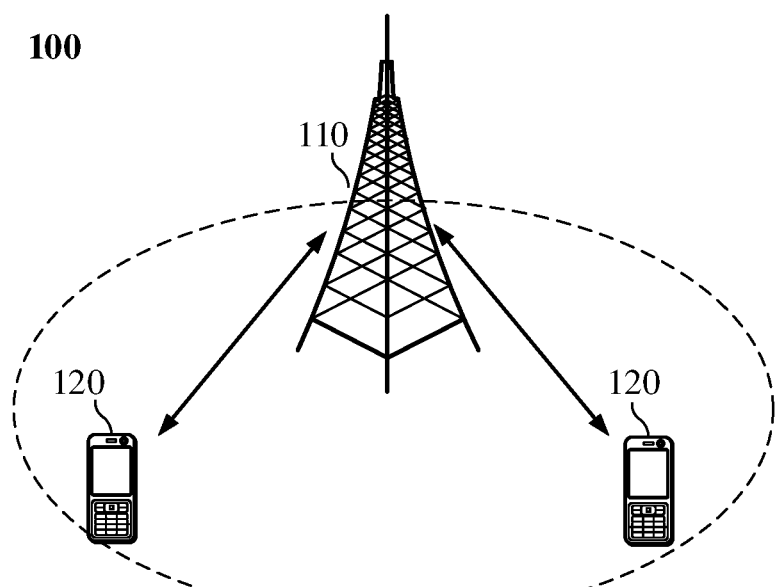
FIG. 1 is a schematic diagram of a communication system architecture according to an embodiment of the present disclosure.

Exemplarily, a communication system 100 to which the embodiments of the present disclosure are applied is illustrated in FIG. 1. The communication system 100 may include a network device 110. The network device 110 may be a device that communicates with a terminal device 120 (also referred to as a communication terminal, a terminal). The network device 110 may provide communication coverage for a specific geographic area and may communicate with a terminal device within the coverage area. In at least one example, the network device 110 may be an Evolutional Node B (eNB or eNodeB) in the LTE system or a wireless controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a future communication system or the like.

The communication system 100 also includes at least one terminal device 120 located within the coverage of the network device 110. The "terminal" used herein includes, but is not limited to, connection via wired lines, such as connection via Public Switched Telephone Networks (PSTN), Digital Subscriber Line (DSL), digital cables, direct cables; and/or another data connection/network; and/or via a wireless interface, such as for a cellular network, a Wireless Local Area Network (WLAN), a digital television network such as DVB-H network, a satellite network, a AM-FM broadcast transmitter; and/or means of another terminal arranged to receive/transmit a communication signal; and/or an Internet of Things (IoT) device. A terminal device configured to communicate via a wireless interface may be referred to as a "wireless communication terminal", "wireless terminal" or "mobile terminal". Examples of mobile terminals include, but are not limited to, satellite or cellular telephones; a Personal Communications System (PCS) terminal that may combine a cellular radio telephone with data processing, fax and data communications capability; a Personal Digital Assistant (PDA) that may include a radio telephone, a pager, Internet/intranet access, a Web browser, memo pad, calendar and/or Global Positioning System (GPS) receiver; and a conventional laptop and/or palmtop receiver or other electronic devices including a radio telephone transceiver. The terminal device may be referred to an access terminal, a User Equipment (UE), a subscriber unit, a subscriber station, a mobile station, a mobile radio station, a remote station, a remote terminal, a mobile device, a user terminal, a terminal, a wireless communication device, a user agent or a user device. The access terminal may be a cellular telephone, a cordless telephone, a Session Initiation Protocol (SIP) telephone, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in a 5G network, a terminal device in a future evolved PLMN or the like.

In one example, Device to Device (D2D) communication may be performed between the terminal devices 120.

In one example, the 5G communication system or 5G network may also be referred to as a New Radio (NR) system or NR network.

FIG. 1 exemplarily illustrates one network device and two terminal devices. In one example, the communication system 100 may include multiple network devices and another number of terminal devices may be included within the coverage of each network device, which is not limited in the embodiments of the present disclosure.

In one example, the communication system 100 may also include another network entity such as a network controller or a mobility management entity, which is not limited in the embodiments of the present disclosure.

It is to be understood that a device with communication function in the network/system in the embodiments of the present disclosure may be referred to as a communication device. Taking the communication system 100 illustrated in FIG. 1 as an example, communication devices may include the network device 110 and the terminal 120 with the communication function. The network device 110 and the terminal 120 may be specific devices mentioned above, and details are not described herein. The communication device may further include another device in the communication system 100, for example, another network entity such as a network controller or a mobility management entity, which is not limited in the embodiments of the present disclosure.

It is to be understood that terms "system" and "network" in the disclosure may usually be exchanged. In the disclosure, the term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

To facilitate understanding of the technical solutions of the embodiments of the present disclosure, the technical solutions related to the embodiments of the present disclosure are described below.

With the pursuit of speed, latency, high-speed mobility and energy efficiency, as well as the diversity and complexity of services in future life, the 3rd Generation Partnership Project (3GPP) began to research and develop 5G. The main application scenarios of 5G are: enhanced Mobile Broadband (eMBB), Ultra-Reliable Low-Latency Communications (URLLC), and massive Machine-Type Communications (mMTC).

On one hand, eMBB still aims at acquiring multimedia content, services and data by users, and its demand is growing rapidly. On the other hand, since the eMBB may be deployed in different scenarios, such as indoor, urban, rural, etc., and the differences in capabilities and requirements are relatively large, it cannot be generalized and must be analyzed in detail with reference to specific deployment scenarios. Typical applications of URLLC include: industrial automation, power automation, telemedicine operation (surgery), traffic safety and so on. Typical characteristics of mMTC include: high connection density, small data size, latency-insensitive services, low cost and long service life of modules, and so on.

In the early NR deployment, it is difficult to obtain complete NR coverage, so the typical network coverage is the mode of wide-area LTE coverage and island coverage of NR. Moreover, a large number of LTEs are deployed below 6 GHz, and there are few spectrums below the 6 GHz available for 5G. Therefore, it is necessary for NR to study spectral applications above 6 GHz, while high frequency band coverage is limited and signal fading is quickly. At the same time, in order to protect previous investment of the mobile operators in LTE, a tight interworking mode of operation between LTE and NR is proposed.

RRC State 5G defines a new Radio Resource Control (RRC) state, i.e., RRC_INACTIVE state, for the purpose of reducing air interface signaling and rapidly recovering wireless connections and data service. This state is different from RRC_IDLE state and RRC_ACTIVE state.

1) RRC_IDLE state (abbreviated as idle state): mobility is UE-based cell selection and reselection, paging is initiated by a Core Network (CN), and paging area is configured by the CN. There is no UE context and no RRC connection on the base station side.
2) RRC_CONNECTED state (abbreviated as the connected state): there is an RRC connection, and there are UE context on both the base station side and UE side. The network side knows that the location of the UE is specific to the cell level. Mobility is controlled by the network side. Unicast data may be transmitted between the UE and the base station.
3) RRC_INACTIVE state (abbreviated as inactive state): mobility is UE-based cell selection and reselection, there is a connection between CN and NR, UE context exists on a certain base station, paging is triggered by RAN, an RAN-based paging area is managed by RAN, and the network side knows that the location of the UE is based on paging area level of RAN.

Beam Sweeping

Figure 2:
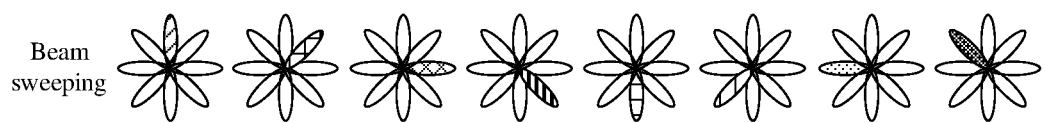
FIG. 2 is a schematic diagram of Beam sweeping according to an embodiment of the present disclosure.
Figure 3:
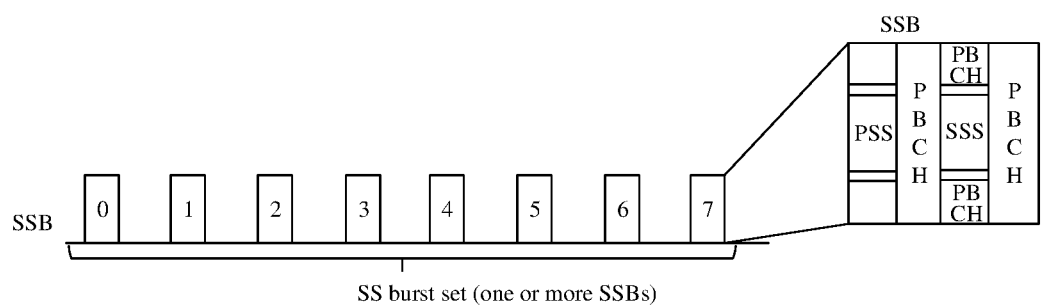
FIG. 3 is a schematic diagram of a Synchronization Signal (SS) and Physical Broadcast Channel (PBCH) block (SS/PBCH block, SSB) according to an embodiment of the present disclosure.
Figure 4:
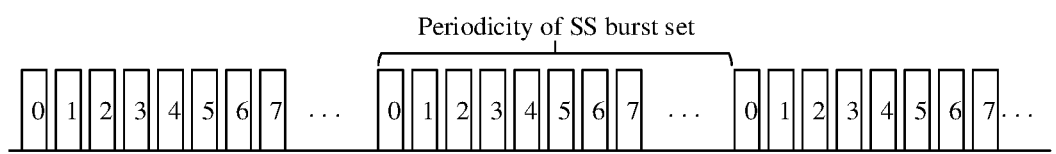
FIG. 4 is a schematic diagram of periodicity of an SSB burst set according to an embodiment of the present disclosure.

NR will be deployed on high frequency in the future. In order to improve coverage, in 5G, the mechanism of beam sweeping is introduced to meet the coverage requirements (replace space for coverage and time for space), as shown in FIG. 2. After introducing the beam sweeping, a synchronization signal is required to be transmitted in each beam direction. The synchronization signal of 5G is given in the form of a Synchronization Signal (SS) and Physical Broadcast Channel (PBCH) block (SS/PBCH block, SSB), including a Primary Synchronization Signal (PSS), a Secondary Synchronization Signal (SSS) and a Physical Broadcast Channel (PBCH), as shown in FIG. 3. As shown in FIG. 4, the synchronization signal of 5G appears periodically in the time domain in the form of a SS burst set.

The number of beams actually transmitted in each cell is determined by network side configuration, but a frequency point where the cell is located determines the maximum number of beams that can be configured, as shown in the Table 1 below.

TABLE 1

| Frequency Range | L(Maximum number of beams) |
| --- | --- |
| up to 3 (2.4) GHz | 4 |
| 3 (2.4) GHz-6 GHz | 8 |
| 6 GHz-52.6 GHz | 64 |

Bandwidth Part (BWP)

The maximum channel bandwidth in 5G may be 400 MHz (i.e., broadband), which is large compared to the maximum channel bandwidth of 20 MHz in LTE. If the UE remains operating on a wideband carrier (i.e., the maximum channel bandwidth), the power consumption of the UE is significant. Therefore, it is suggested that the radio frequency bandwidth of the UE may be adjusted according to the actual throughput of the UE. Therefore, the concept of BWP is introduced, and the motivation of introducing BWP is to optimize the power consumption of the UE. For example, if the rate requirement of the UE is low, the UE may be configured with a smaller bandwidth (i.e., BWP with a smaller bandwidth). If the rate requirement of the UE is high, the UE may be configured with a larger bandwidth (i.e., BWP with a larger bandwidth). If the UE supports high rates or operates in Carrier aggregation (CA) mode, the UE may be configured with multiple BWPs. Further, another purpose of the BWP is to trigger coexistence of multiple numerologies in one cell, such as BWP1 corresponds to numerology1 and BWP2 corresponds to numerology2.

The UE in the idle state or the inactive state resides on the initial BWP. The initial BWP is visible to the UE in the idle state or the inactive state. The UE may acquire information such as a Master Information Block (MIB), Remaining Minimum system Information (RMSI), Other System Information (OSI) and paging information on the initial BWP.

MBMS

MBMS is introduced into 3GPP Release 6 (R6). MBMS is a technology for transmitting data from one data source to multiple UEs through sharing network resources, which can effectively utilize network resources while providing multimedia services to realize broadcast and multicast of multimedia services with a higher rate (e.g., 256 kbps).

Due to the low spectrum efficiency of MBMS in 3GPP R6, it is not enough to effectively carry and support the operation of mobile TV type service. Therefore, in LTE, 3GPP explicitly proposes to enhance the support capability for downlink high-speed MBMS, and determines the design requirements for physical layer and air interface.

The 3GPP R9 introduces evolved MBMS (eMBMS) into LTE. EMBMS proposes the concept of Single Frequency Network (SFN), that is, Multimedia Broadcast multicast service Single Frequency Network (MBSFN). The MBSFN transmits service data simultaneously in all cells using a uniform frequency, but it should be ensure synchronization between cells. In this way, the overall signal-to-noise ratio distribution of the cell can be greatly improved, and the spectral efficiency can be greatly improved accordingly. The eMBMS implements broadcast and multicast of service based on IP multicast protocol.

In LTE or LTE-Advanced (LTE-A), the MBMS has only a broadcast bearer mode and no multicast bearer mode. Further, the reception of the MBMS service is applicable to the UE in the idle state or the connected state.

The concept of Single Cell Point to Multiploint (SC-PTM) is introduced into 3GPP R13, and the SC-PTM is based on MBMS network architecture.

The MBMS introduces new logical channels, including a Single Cell-Multicast Control Channel (SC-MCCH) and a Single Cell-Multicast Transport Channel (SC-MTCH). The SC-MCCH and SC-MTCH are mapped onto a Downlink-Shared Channel (DL-SCH), and further, the DL-SCH is mapped onto a Physical Downlink Shared Channel (PDSCH). The SC-MCCH and SC-MTCH are logical channels, the DL-SCH is a transmission channel, and the PDSCH is a physical channel. The SC-MCCH and SC-MTCH do not support Hybrid Automatic Repeat reQuest (HARQ) operations.

The MBMS introduces a new System Information Block (SIB) type, i.e., SIB20. Specifically, configuration information of the SC-MCCH is transmitted through the SIB20, and there is only one SC-MCCH per cell. The configuration information of the SC-MCCH includes: a modification period of the SC-MCCH, a repetition period of the SC-MCCH, and information such as a radio frame and subframe for scheduling the SC-MCCH. Further, 1) a boundary of the modification period of the SC-MCCH satisfies SFN mod m=0, where SFN represents a system frame number of the boundary, and m is the modification period of the SC-MCCH (i.e., sc-mcch-ModificationPeriod) configured in the SIB20. 2) The radio frame for scheduling the SC-MCCH satisfies SFN mod mcch-RepetitionPeriod=mcch-Offset, where the SFN represents a system frame number of the radio frame, mcch-RepetitionPeriod represents the repetition period of the SC-MCCH, and mcch-Offset represents an offset of the SC-MCCH. 3) The subframe for scheduling the SC-MCCH is indicated by the sc-mcch-S ubframe.

The SC-MCCH is scheduled through a Physical Downlink Control Channel (PDCCH). On one hand, a new Radio Network Tempory Identity (RNTI), i.e., a Single Cell RNTI (SC-RNTI) is introduced to identify a PDCCH for scheduling the SC-MCCH (e.g., SC-MCCH PDCCH). Optionally, a fixed value of the SC-RNTI is FFFC. On the other hand, a new RNTI, i.e., a Single Cell Notification RNTI (SC-N-RNTI) is introduced to identify a PDCCH for indicating a change notification of the SC-MCCH (e.g., a notification PDCCH), and optionally, a fixed value of the SC-N-RNTI is FFFB. Further, one of the eight bits of the DCI 1C may be used to indicate the change notification. In LTE, configuration information of the SC-PTM is based on the SC-MCCH configured by the SIB20, and then the SC-MCCH configures the SC-MTCH for transmitting the service data.

Specifically, the SC-MCCH transmits only one message (i.e., SCPTMConfiguration), which is used to configure the configuration information of the SC-PTM. The configuration information of the SC-PTM includes: a Temporary Mobile Group Identity (TMGI), a session id, a Group RNTI (G-RNTI), Discontinuous Reception (DRX) configuration information, SC-PTM service information of an adjacent area, and so on. It is to be noted that the SC-PTM in R13 does not support Robust Header Compression (ROHC) function.

The downlink DRX of the SC-PTM is controlled by the following parameters: onDurationTimerSCPTM, drx-InactivityTimerSCPTM, SC-MTCH-SchedulingCycle, and SC-MTCH-SchedulingOffset.

When [(SFN*10)+subframe number] modulo (SC-MTCH-SchedulingCycle)=SC-MTCH-SchedulingOffset is satisfied, the timer onDurationTimerSCPTM is started.

When downlink PDCCH scheduling is received, the timer drx-InactivityTimerSCPTM is started.

Downlink SC-PTM service is received only when the timer onDurationTimerSCPTM or drx-InactivityTimerSCPTM is running.

SC-PTM service continuity adopts the SIB15-based MBMS service continuity concept, i.e., "SIB15+MBMSInterestIndication" manner. The service continuity of the UE in the idle state is based on the concept of frequency priority.

In NR, many scenarios require service requirements that support multicast and broadcast, such as in Internet of Vehicles, Industrial Internet, and so on. Therefore, it is necessary to introduce the MBMS into NR. In the technical solution of the embodiment of the present disclosure, a method for configuring radio resource of the MBMS is provided firstly, and specifically, a method for semi-static configuring radio resource is provided. Secondly, a method for beam sweeping of the MBMS data is provided, to enable the NR system to support radio resource allocation of the MBMS and beam sweeping transmission of the MBMS data.

Figure 5:
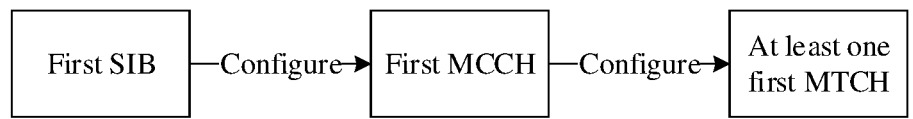
FIG. 5 is a schematic diagram of a first System Information Block (SIB) related configuration according to an embodiment of the present disclosure.

In the technical solution of the embodiment of the present disclosure, a new SIB (referred to as a first SIB) is defined. Referring to FIG. 5, the first SIB include configuration information of a first MCCH. Here, the first MCCH is a control channel of the MBMS. In other words, the first SIB is used to configure configuration information of control channel of NR MBMS. Optionally, the control channel of NR MBMS may also be referred to as NR MCCH (i.e., the first MCCH).

Further, the first MCCH is used to carry a first signaling. In this embodiment of the present disclosure, the name of the first signaling is not limited. For example, the first signaling is a signaling A, and the first signaling includes configuration information of at least one first MTCH. Here, the first MTCH is a service channel (also referred to as a data channel or a transmission channel) of the MBMS, and the first MTCH is used to transmit MBMS data (such as service data of NR MBMS). In other words, the first MCCH is used to configure the configuration information of the service channel of NR MBMS. Optionally, the service channel of NR MBMS may also be referred to as NR MTCH (i.e., the first MTCH).

Specifically, the first signaling is used to configure the service channel of NR MBMS, service information corresponding to the service channel and scheduling information corresponding to the service channel. Further, optionally, the service information corresponding to the service channel includes, for example, identification information for identifying service such as TMGI and session id. The scheduling information corresponding to the service channel includes, for example, RNTI used when MBMS data corresponding to the service channel is scheduled, such as G-RNTI, and DRX configuration information.

It is to be noted that both the transmission of the first MCCH and the first MTCH are scheduled based on the PDCCH. The RNTI used by the PDCCH for scheduling the first MCCH uses a network-wide unique identifier, i.e., a fixed value. The RNTI used by the PDCCH for scheduling the first MTCH is configured by the first MCCH.

Figure 6:
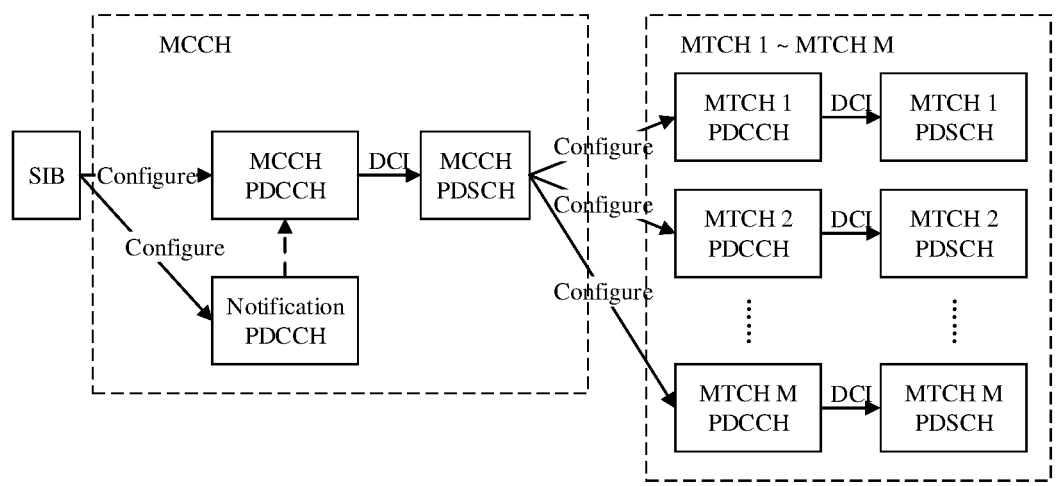
FIG. 6 is a schematic diagram of a Point to Multiploint (PTM) configuration transmission mechanism according to an embodiment of the present disclosure.
Figure 7:
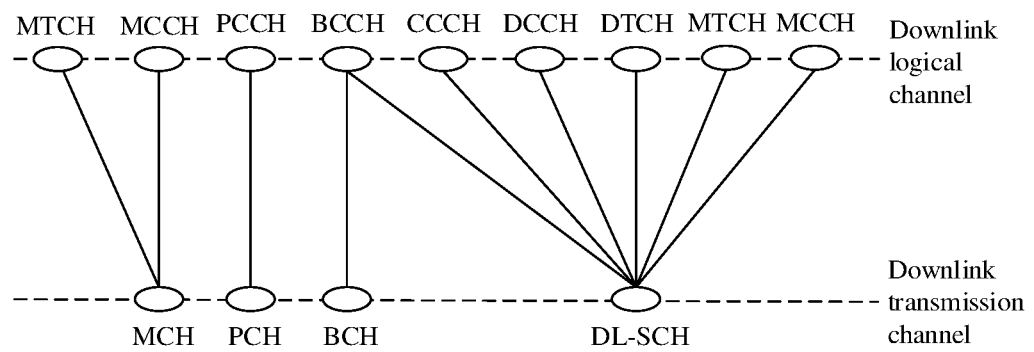
FIG. 7 is a PTM channel and a map thereof according to an embodiment of the present disclosure.

It is to be noted that the naming of the first SIB, the first MCCH, and the first MTCH is not limited in the embodiments of the present disclosure. For convenience of description, the first SIB may be simply referred to as SIB, the first MCCH may be simply referred to as MCCH, and the first MTCH may be simply referred to as MTCH. Referring to FIG. 6, the PDCCH for scheduling the MCCH (i.e., MCCH PDCCH) and the notification PDCCH are configured through the SIB, where the PDSCH for transmitting the MCCH (i.e., MCCH PDSCH) is scheduled through DCI carried by the MCCH PDCCH. Further, M PDCCHs for scheduling the MTCH (i.e., MTCH 1 PDCCH, MTCH 2 PDCCH, MTCH M PDCCH) are configured through the MCCH. The DCI carried by the MTCH n PDCCH schedules the PDSCH for transmitting the MTCH n (i.e., MTCH n PDSCH), and n is an integer greater than or equal to 1 and less than or equal to M. Referring to FIG. 7, the MCCH and MTCH are mapped onto the DL-SCH, and further, the DL-SCH is mapped onto the PDSCH. The MCCH and MTCH are logical channels, the DL-SCH is a transmission channel, and the PDSCH is a physical channel.

FIG. 8 is a flowchart of a method for resource configuration according to an embodiment of the present disclosure. As shown in FIG. 8, the method for resource configuration includes the following operation.

At 801: a terminal device receives first configuration information from a network device. The first configuration information is used for determining a radio resource configuration of an MBMS.

In the embodiment of the present disclosure, the network device transmits the first configuration information to the terminal device, and correspondingly, the terminal device receives the first configuration information from the network device. In an alternative embodiment, the network device may be a base station, such as a gNB.

In an alternative embodiment of the present disclosure, the first configuration information is carried in a system broadcast message or an MCCH. For example, the first configuration information is carried in the first SIB or the first MCCH. Here, the first SIB and the first MCCH may be understood with reference to the above related description.

In a specific implementation, the network device may pre-configure radio resource (such as configured grant or pre-configured Grant) for transmitting MBMS through the system broadcast message or the MCCH.

In an alternative embodiment, the network device side is a separate architecture of a Centralized Unit (CU) and a Distributed Unit (DU), which can be considered that the network device includes the CU and at least one DU. In this way, the first configuration information is transmitted by the CU to the at least one DU. It is to be noted that in the case of multiple DUs, the first configuration information transmitted by the CU to the multiple DUs is the same.

Figure 9:
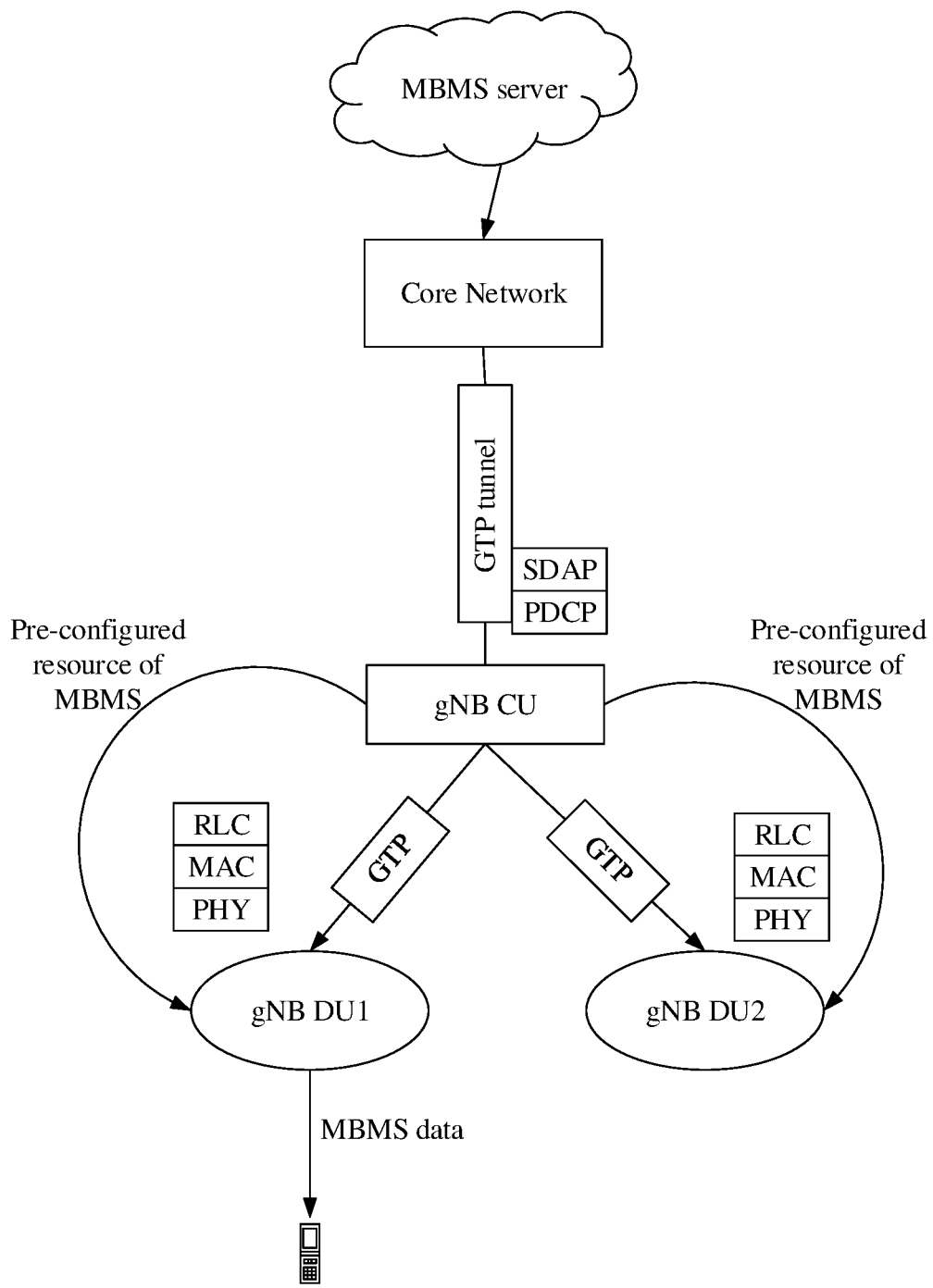
FIG. 9 is a network architecture diagram according to an embodiment of the present disclosure.

Referring to FIG. 9, a pre-configured radio resource (such as, configured grant or pre-configured Grant) is transmitted by the gNB CU to the gNB DU through the F1 interface. Here, the F1 interface is an interface between gNB CU and gNB DU.

In this embodiment of the present disclosure, the first configuration information is used for determining the radio resource configuration of the MBMS, and a specific implementation of the first configuration information will be described in detail below.

First Manner (1) Configuration of MBMS BWP

The first configuration information includes configuration information of an MBMS BWP, and the configuration information of the MBMS BWP includes frequency domain configuration information and time domain configuration information. The frequency domain configuration information includes at least one of a frequency domain position of the MBMS BWP or bandwidth information of the MBMS BWP; and the time domain configuration information includes at least one of a period of the MBMS BWP or a duration of the MBMS BWP.

Figure 10A:
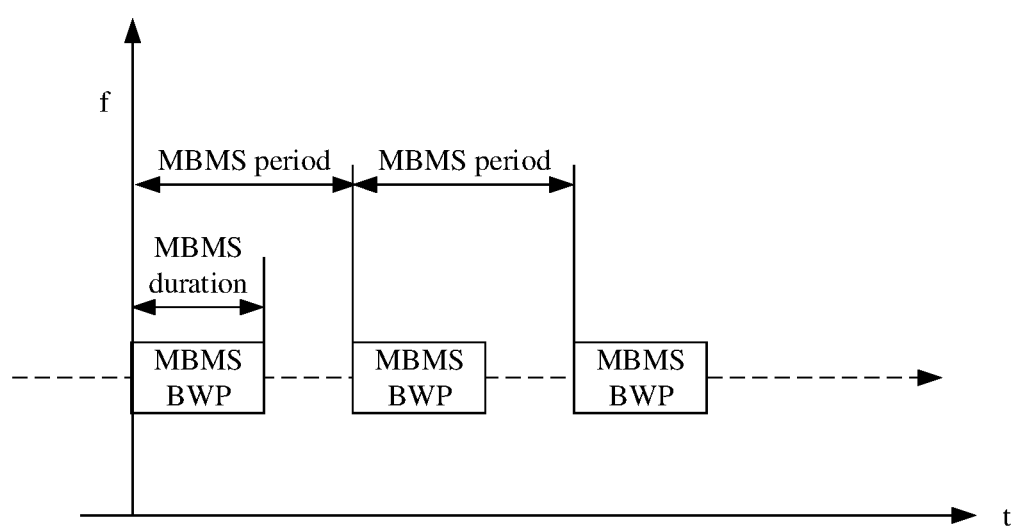
FIG. 10A is a first schematic diagram of resource configuration according to an embodiment of the present disclosure.

In this case, the MBMS BWP configured by the network side is fixed in the frequency domain and discontinuous in the time domain, but it occurs periodically. Referring to FIG. 10A, MBMS duration represents the duration of the MBMS BWP, and MBMS period represents the period of the MBMS BWP.

In the above resource reservation manner, all resources in the frequency domain are used to transmit the MBMS, and there is no need to be specified by signaling. In the time domain, several symbols or slots may be configured to correspond to one MBMS occasion through signaling. Here, the MBMS occasion may also be referred to as an MBMS resource. Specifically, the network device transmits second configuration information to the terminal device, and correspondingly, the terminal device receives the second configuration information from the network device. The second configuration information is used to determine the number of time units included in one MBMS occasion. Further, optionally, the time unit is a symbol or a slot.

(2) Configuration Related to Beam Sweeping

The MBMS BWP configured in the above manner is capable of transmitting one or more MBMS data, and the MBMS BWP includes one or more groups of MBMS occasions. Each group of MBMS occasions within the MBMS BWP correspond to transmission of a respective one of the one or more MBMS data. Each MBMS occasion in the each group of MBMS occasions is associated with a respective beam for the transmission of the MBMS data, and each beam corresponds to a respective SSB; or, each MBMS occasion in the each group of MBMS occasions is associated with a respective SSB index.

In an alternative embodiment, the number of MBMS data capable of being transmitted within the MBMS BWP is configured through the system broadcast message or the MCCH.

For example, the each group of MBMS occasions includes N MBMS occasions, and N is a positive integer. A i-th MBMS occasion of the N MBMS occasions is associated with a SSB index corresponding to a i-th beam for the transmission of the MBMS data, $1 \le i \le N$ and i is a positive integer.

For example, the data transmission in NR adopts the beam sweeping manner. It is assumed that the number of SSBs actually transmitted is N, and one MBMS duration (corresponding to one MBMS BWP) includes S MBMS occasions. In the S MBMS occasions, the first MBMS occasion corresponds to the first SSB actually transmitted of the Data1 (i.e., the first MBMS data), the second MBMS occasion corresponds to the second SSB actually transmitted of the Data1, and so on. Then, the (N+1)-th MBMS occasion corresponds to the first SSB actually transmitted of the Data2 (i.e., the second MBMS data), the (N+2)-th MBMS occasion corresponds to the second SSB actually transmitted of the Data2, and so on, until the MBMS duration ends or the complete beam sweeping cannot be mapped. The number of MBMS data that can be transmitted in one MBMS duration is floor (S/N), where the floor represents a rounding down function. It is to be noted that each MBMS duration may corresponds to transmission of one MBMS or multiple MBMS data. Optionally, the number of MBMS data capable of being transmitted in one MBMS duration may be configured through the system broadcast message or the MCCH.

Second Manner (1) Configuration of MBMS BWP

The first configuration information includes configuration information of an MBMS BWP. The configuration information of the MBMS BWP includes frequency domain configuration information. The frequency domain configuration information includes at least one of a frequency domain position of the MBMS BWP or bandwidth information of the MBMS BWP.

Figure 10B:
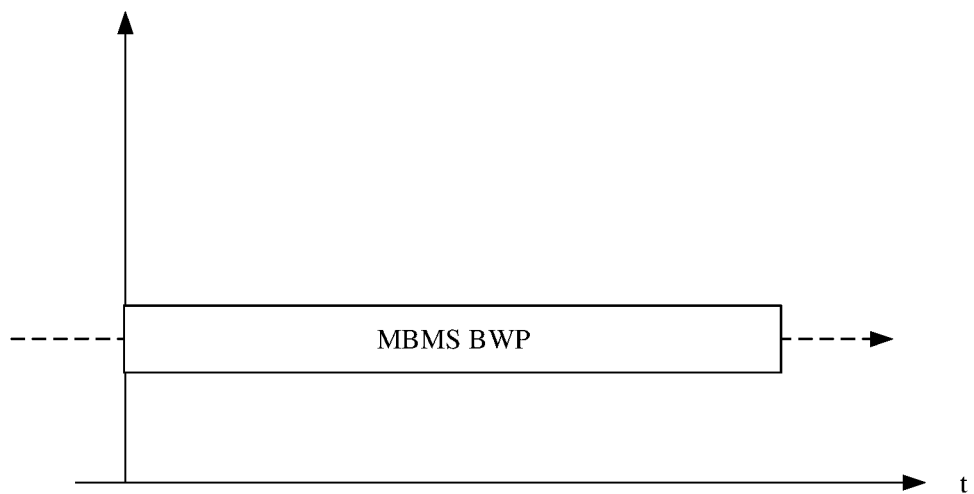
FIG. 10B is a second schematic diagram of resource configuration according to an embodiment of the present disclosure.

In this case, the MBMS BWP configured by the network side is fixed in the frequency domain and continuous in the time domain. Referring to FIG. 10B, the MBMS BWP is a BWP configured for the MBMS by the network side, and the initial BWP is an initial BWP configured by the network side.

In the above resource reservation manner, all resources in the frequency domain are used to transmit the MBMS, and there is no need to be specified by signaling. In the time domain, several symbols or slots may be configured to correspond to one MBMS occasion through signaling. Here, the MBMS occasion may also be referred to as an MBMS resource. Specifically, the network device transmits second configuration information to the terminal device, and correspondingly, the terminal device receives the second configuration information from the network device. The second configuration information is used to determine the number of time units included in one MBMS occasion. Further, optionally, the time unit is a symbol or a slot.

Further, in an alternative embodiment, an MBMS window (i.e., MBMS duration) is defined, and the MBMS window or MBMS duration may be configured in the following manners.

a) The MBMS BWP includes multiple MBMS windows in the time domain. The first configuration information further includes configuration information of the MBMS window. The configuration information of the MBMS window includes at least one of: a period of the MBMS window, a duration of the MBMS window, or offset information of the MBMS window.

Here, the position of the MBMS window may be determined in the time domain based on the configuration information of the MBMS window.

b) The MBMS BWP includes multiple MBMS windows in the time domain; and each of the multiple MBMS windows corresponds to a respective radio frame.

Here, it is understood that a radio frame is an MBMS window or MBMS duration.

(2) Configuration Related to Beam Sweeping

The MBMS window configured in the above manner is capable of transmitting one or more MBMS data; and the MBMS window includes one or more groups of MBMS occasions. Each group of MBMS occasions within the MBMS window correspond to transmission of a respective one of the one or more MBMS data. Each MBMS occasion in the each group of MBMS occasions is associated with a respective beam for the transmission of the MBMS data, and each beam corresponds to a respective SSB; or, each MBMS occasion in the each group of MBMS occasions is associated with a respective SSB index.

In an alternative embodiment, the number of MBMS data capable of being transmitted within the MBMS window is configured through the system broadcast message or the MCCH.

For example, the each group of MBMS occasions includes N MBMS occasions, and N is a positive integer. A i-th MBMS occasion of the N MBMS occasions is associated with a SSB index corresponding to a i-th beam for the transmission of the MBMS data, $1 \leq i \leq N$ and i is a positive integer.

For example, the data transmission in NR adopts the beam sweeping manner. It is assumed that the number of SSBs actually transmitted is N, and one MBMS duration (corresponding to one MBMS window or one radio frame) includes S MBMS occasions. In the S MBMS occasions, the first MBMS occasion corresponds to the first SSB actually transmitted of the Data1 (i.e., the first MBMS data), the second MBMS occasion corresponds to the second SSB actually transmitted of the Data1, and so on. Then, the (N+1)-th MBMS occasion corresponds to the first SSB actually transmitted of the Data2 (i.e., the second MBMS data), the (N+2)-th MBMS occasion corresponds to the second SSB actually transmitted of the Data2, and so on, until the MBMS duration ends or the complete beam sweeping cannot be mapped. The number of MBMS data that can be transmitted in one MBMS duration is floor (S/N), where the floor represents a rounding down function. It is to be noted that each MBMS duration may corresponds to transmission of one MBMS or multiple MBMS data. Optionally, the number of MBMS data capable of being transmitted in one MBMS duration may be configured through the system broadcast message or the MCCH.

Third Manner (1) Configuration of MBMS Occasion

The first configuration information includes configuration information of an MBMS occasion of an MBMS. The configuration information of the MBMS occasion includes frequency domain configuration information and time domain configuration information.

The frequency domain configuration information includes at least one of: frequency domain resource positions of M MBMS occasions or a bandwidth of each of the M MBMS occasions, where M is a positive integer. Or, the frequency domain configuration information includes at least one of: a number M of MBMS occasions included in a frequency domain, a start frequency domain position of a first MBMS occasion in the frequency domain, a bandwidth of the MBMS occasion, or a frequency domain interval between two adjacent MBMS occasions.

The time domain configuration information is configured to determine N groups of MBMS occasions in the time domain, where N is a positive integer.

It can be understood that the resource positions of the M MBMS occasions in the frequency domain may be determined based on the frequency domain configuration information above mentioned, and the N groups of MBMS occasions in the time domain may be determined based on the time domain configuration information above mentioned. Each group of MBMS occasions includes the M MBMS occasions in the frequency domain. It can be seen that the MBMS occasions are distributed in the frequency domain and/or in the time domain periodically.

Figure 10C:
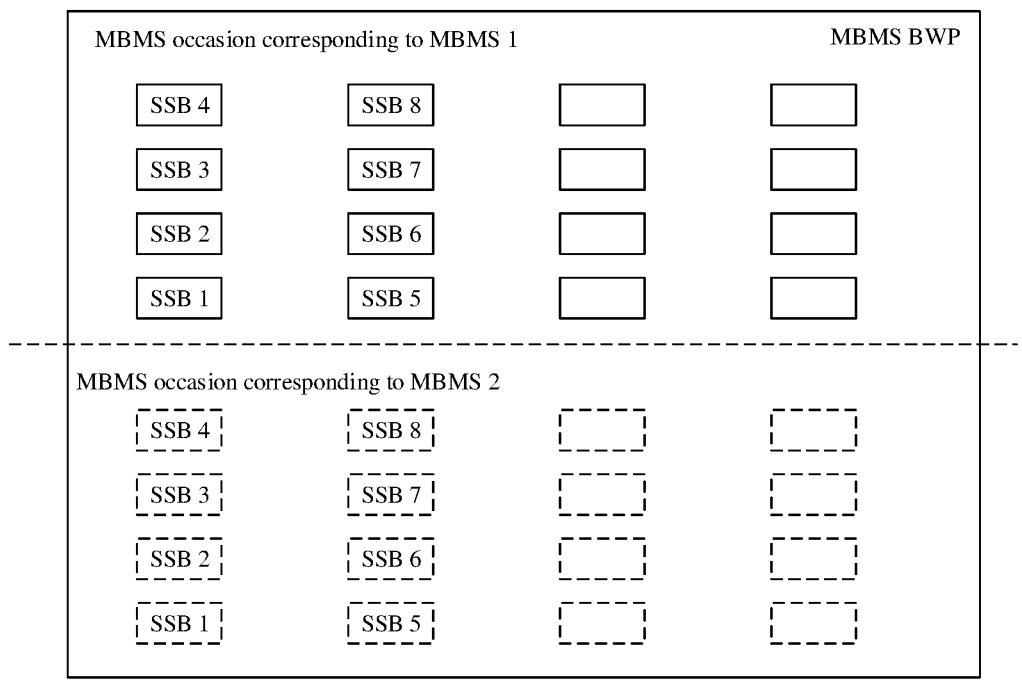
FIG. 10C is a third schematic diagram of resource configuration according to an embodiment of the present disclosure.

In an alternative embodiment, for each MBMS, the MBMS occasion of the MBMS may be configured through the system broadcast message or the MCCH. As shown in FIG. 10C, each of MBMS1 and MBMS2 is configured with a respective MBMS occasion.

(2) Configuration Related to Beam Sweeping

Figure 10D:
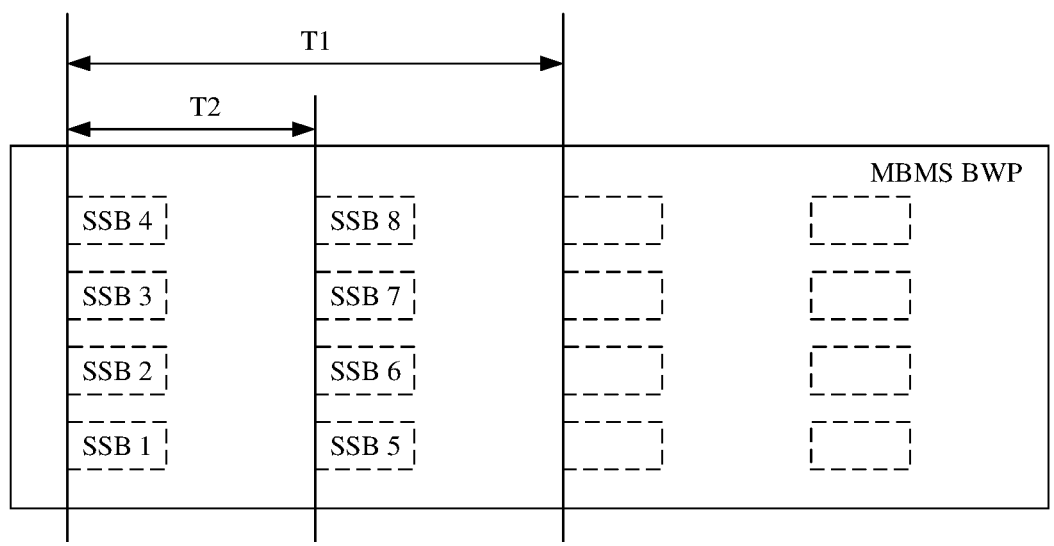
FIG. 10D is a fourth schematic diagram of resource configuration according to an embodiment of the present disclosure.

The network device configures the beam sweeping period of MBMS occasion (as shown in T1 in FIG. 10D). Each beam sweeping period in the time domain is capable of transmitting a respective MBMS data, and the each beam sweeping period includes one or more groups of MBMS occasions in the time domain, and each group of MBMS occasions includes M MBMS occasions in the frequency domain.

Further, optionally, the time domain configuration information is further used for determining a time interval between two adjacent groups of MBMS occasions (as shown in T2 in FIG. 10D) responsive to the each beam sweeping period including multiple groups of MBMS occasions in the time domain.

In an alternative embodiment, MBMS occasions in the each beam sweeping period are associated with SSBs corresponding to beams for transmission of the MBMS data in a manner of first frequency domain and then time domain. Alternatively, in another alternative embodiment, MBMS occasions in the each beam sweeping period are associated with SSBs corresponding to beams for transmission of the MBMS data in a manner of time domain first and then frequency domain.

For example, all MBMS occasions in the beam sweeping period are associated with the SSBs actually transmitted in a manner of first frequency domain and then time domain. As shown in FIG. 10D, a first MBMS occasion is associated with SSB1, a second MBMS occasion is associated with SSB2, and so on. The MBMS occasion associated with the SSB is used for MBMS data transmission on the beam corresponding to the SSB.

In an alternative embodiment, a MBMS occasion of one MBMS may be configured with one corresponding MBMS BWP. Alternatively, in another alternative embodiment, MBMS occasions of multiple MBMSs share one MBMS BWP. Alternatively, in yet another alternative embodiment, the MBMS occasion of the MBMS is not associated with any configured MBMS BWP.

In an alternative embodiment, in the time domain, several symbols or slots may be configured to correspond to one MBMS occasion through signaling. Specifically, the network device transmits second configuration information to the terminal device, and correspondingly, the terminal device receives the second configuration information from the network device. The second configuration information is used to determine the number of time units included in one MBMS occasion. Further, optionally, the time unit is a symbol or a slot.

The above technical solution of the embodiment of the present disclosure provides a method for semi-static radio resource configuration, so that the transmission of MBMS can be realized efficiently.

Figure 11:
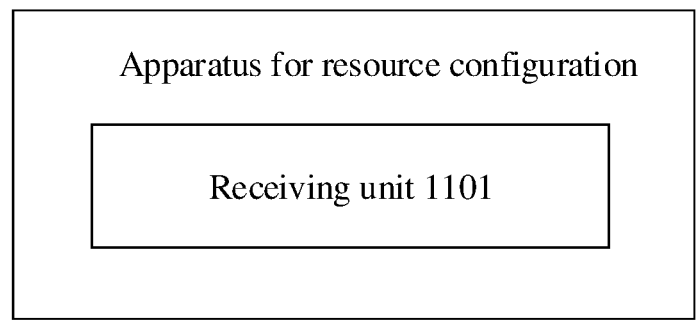
FIG. 11 is a first schematic structural diagram of an apparatus for resource configuration according to an embodiment of the present disclosure.

FIG. 11 is a first schematic structural diagram of an apparatus for resource configuration according to an embodiment of the present disclosure, which is applied to a terminal device. As shown in FIG. 11, the apparatus for resource configuration includes a receiving unit 1101.

The receiving unit 1101 is configured to receive first configuration information from a network device. The first configuration information is used for determining a radio resource configuration of a MBMS.

In an alternative embodiment, the first configuration information includes configuration information of an MBMS BWP, and the configuration information of the MBMS BWP includes frequency domain configuration information and time domain configuration information.

The frequency domain configuration information includes at least one of a frequency domain position of the MBMS BWP or bandwidth information of the MBMS BWP.

The time domain configuration information includes at least one of a period of the MBMS BWP or a duration of the MBMS BWP.

In an alternative embodiment, the MBMS BWP is capable of transmitting one or more MBMS data, and the MBMS BWP includes one or more groups of MBMS occasions.

Each group of MBMS occasions within the MBMS BWP correspond to transmission of a respective one of the one or more MBMS data. Each MBMS occasion in the each group of MBMS occasions is associated with a respective beam for the transmission of the MBMS data, and each beam corresponds to a respective SSB; or, each MBMS occasion in the each group of MBMS occasions is associated with a respective SSB index.

In an alternative embodiment, the each group of MBMS occasions includes N MBMS occasions, and N is a positive integer.

A i-th MBMS occasion of the N MBMS occasions is associated with a SSB index corresponding to a i-th beam for the transmission of the MBMS data, $1 \leq i \leq N$ and i is a positive integer.

In an alternative embodiment, a number of MBMS data capable of being transmitted within the MBMS BWP is configured through a system broadcast message or a MCCH.

In an alternative embodiment, the first configuration information includes configuration information of an MBMS BWP, and the configuration information of the MBMS BWP includes frequency domain configuration information.

The frequency domain configuration information includes at least one of a frequency domain position of the MBMS BWP or bandwidth information of the MBMS BWP.

In an alternative embodiment, the MBMS BWP includes multiple MBMS windows in a time domain.

The first configuration information further includes configuration information of an MBMS window. The configuration information of the MBMS window includes at least one of: a period of the MBMS window, a duration of the MBMS window, or offset information of the MBMS window.

In an alternative embodiment, the MBMS BWP includes multiple MBMS windows in a time domain.

Each of the multiple MBMS windows corresponds to a respective radio frame.

In an alternative embodiment, the MBMS window is capable of transmitting one or more MBMS data, and the MBMS window includes one or more groups of MBMS occasions.

Each group of MBMS occasions within the MBMS window correspond to transmission of a respective one of the one or more MBMS data. Each MBMS occasion in the each group of MBMS occasions is associated with a respective beam for the transmission of the MBMS data, and each beam corresponds to a respective SSB; or, each MBMS occasion in the each group of MBMS occasions is associated with a respective SSB index.

In an alternative embodiment, the each group of MBMS occasions includes N MBMS occasions, and N is a positive integer.

A i-th MBMS occasion of the N MBMS occasions is associated with a SSB index associated with a i-th beam for the transmission of the MBMS data, 1≤i≤N and i is a positive integer.

In an alternative embodiment, a number of MBMS data capable of being transmitted within the MBMS window is configured through a system broadcast message or an MCCH.

In an alternative embodiment, the first configuration information includes configuration information of an MBMS occasion of an MBMS, and the configuration information of the MBMS occasion includes frequency domain configuration information and time domain configuration information.

The frequency domain configuration information includes at least one of: frequency domain resource positions of M MBMS occasions or a bandwidth of each of the M MBMS occasions, and M is a positive integer. Or, the frequency domain configuration information includes at least one of: a number M of MBMS occasions included in a frequency domain, a start frequency domain position of a first MBMS occasion in the frequency domain, a bandwidth of the MBMS occasion, or a frequency domain interval between two adjacent MBMS occasions.

The time domain configuration information is configured to determine N groups of MBMS occasions in a time domain, and N is a positive integer.

In an alternative embodiment, each beam sweeping period in the time domain is capable of transmitting a respective MBMS data, the each beam sweeping period includes one or more groups of MBMS occasions in the time domain, and each group of MBMS occasions includes M MBMS occasions in the frequency domain.

In an alternative embodiment, the time domain configuration information is further used for determining a time interval between two adjacent groups of MBMS occasions responsive to the each beam sweeping period including multiple groups of MBMS occasions in the time domain.

In an alternative embodiment, MBMS occasions in the each beam sweeping period are associated with SSBs corresponding to beams for transmission of the MBMS data in a manner of first frequency domain and then time domain. Or, MBMS occasions in the each beam sweeping period are associated with SSBs corresponding to beams for transmission of the MBMS data in a manner of time domain first and then frequency domain.

In an alternative embodiment, the receiving unit 1101 is further configured to receive second configuration information from the network device. The second configuration information is used for determining a number of time units includes in one MBMS occasion.

In an alternative embodiment, a time unit is a symbol or a slot.

In an alternative embodiment, the first configuration information is carried in a system broadcast message or an MCCH.

In an alternative embodiment, the network device includes a CU and at least one DU, and the first configuration information is transmitted by the CU to the at least one DU.

It is to be understood by those skilled in the art that the description of the apparatus for resource configuration described above in the embodiments of the present disclosure may be understood with reference to the description of the method for resource configuration in the embodiments of the present disclosure.

Figure 12:
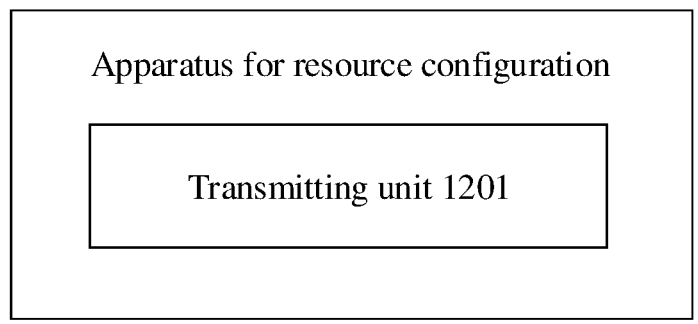
FIG. 12 is a second schematic structural diagram of an apparatus for resource configuration according to an embodiment of the present disclosure.

FIG. 12 is a second schematic structural diagram of an apparatus for resource configuration according to an embodiment of the present disclosure, which is applied to a network device. As shown in FIG. 12, the apparatus for resource configuration includes a transmitting unit 1201.

The transmitting unit 1201 is configured to transmit first configuration information to a terminal device. The first configuration information is used for determining a radio resource configuration of a MBMS.

In an alternative embodiment, the first configuration information includes configuration information of an MBMS BWP, and the configuration information of the MBMS BWP includes frequency domain configuration information and time domain configuration information.

The frequency domain configuration information includes at least one of a frequency domain position of the MBMS BWP or bandwidth information of the MBMS BWP.

The time domain configuration information includes at least one of a period of the MBMS BWP or a duration of the MBMS BWP.

In an alternative embodiment, the MBMS BWP is capable of transmitting one or more MBMS data, and the MBMS BWP includes one or more groups of MBMS occasions.

Each group of MBMS occasions within the MBMS BWP correspond to transmission of a respective one of the one or more MBMS data. Each MBMS occasion in the each group of MBMS occasions is associated with a respective beam for the transmission of the MBMS data, and each beam corresponds to a respective SSB; or, each MBMS occasion in the each group of MBMS occasions is associated with a respective SSB index.

In an alternative embodiment, the each group of MBMS occasions includes N MBMS occasions, and N is a positive integer.

A i-th MBMS occasion of the N MBMS occasions is associated with a SSB index corresponding to a i-th beam for the transmission of the MBMS data, 1≤i≤N and i is a positive integer.

In an alternative embodiment, a number of MBMS data capable of being transmitted within the MBMS BWP is configured through a system broadcast message or a MCCH.

In an alternative embodiment, the first configuration information includes configuration information of an MBMS BWP, and the configuration information of the MBMS BWP includes frequency domain configuration information.

The frequency domain configuration information includes at least one of a frequency domain position of the MBMS BWP or bandwidth information of the MBMS BWP.

In an alternative embodiment, the MBMS BWP includes multiple MBMS windows in a time domain.

The first configuration information further includes configuration information of an MBMS window. The configuration information of the MBMS window includes at least one of: a period of the MBMS window, a duration of the MBMS window, or offset information of the MBMS window.

In an alternative embodiment, the MBMS BWP includes multiple MBMS windows in a time domain.

Each of the multiple MBMS windows corresponds to a respective radio frame.

In an alternative embodiment, the MBMS window is capable of transmitting one or more MBMS data, and the MBMS window includes one or more groups of MBMS occasions.

Each group of MBMS occasions within the MBMS window correspond to transmission of a respective one of the one or more MBMS data. Each MBMS occasion in the each group of MBMS occasions is associated with a respective beam for the transmission of the MBMS data, and each beam corresponds to a respective SSB; or, each MBMS occasion in the each group of MBMS occasions is associated with a respective SSB index.

In an alternative embodiment, the each group of MBMS occasions includes N MBMS occasions, and N is a positive integer.

A i-th MBMS occasion of the N MBMS occasions is associated with a SSB index associated with a i-th beam for the transmission of the MBMS data, $1 \leq i \leq N$ and i is a positive integer.

In an alternative embodiment, a number of MBMS data capable of being transmitted within the MBMS window is configured through a system broadcast message or an MCCH.

In an alternative embodiment, the first configuration information includes configuration information of an MBMS occasion of an MBMS, and the configuration information of the MBMS occasion includes frequency domain configuration information and time domain configuration information.

The frequency domain configuration information includes at least one of: frequency domain resource positions of M MBMS occasions or a bandwidth of each of M MBMS occasions, and M is a positive integer. Or, the frequency domain configuration information includes at least one of: a number M of MBMS occasions included in a frequency domain, a start frequency domain position of a first MBMS occasion in the frequency domain, a bandwidth of the MBMS occasion, or a frequency domain interval between two adjacent MBMS occasions.

The time domain configuration information is configured to determine N groups of MBMS occasions in a time domain, and N is a positive integer.

In an alternative embodiment, each beam sweeping period in the time domain is capable of transmitting a respective MBMS data, the each beam sweeping period includes one or more groups of MBMS occasions in the time domain, and each group of MBMS occasions includes M MBMS occasions in the frequency domain.

In an alternative embodiment, the time domain configuration information is further used for determining a time interval between two adjacent groups of MBMS occasions responsive to the each beam sweeping period including multiple groups of MBMS occasions in the time domain.

In an alternative embodiment, MBMS occasions in the each beam sweeping period are associated with SSBs corresponding to beams for transmission of the MBMS data in a manner of first frequency domain and then time domain.

Or, MBMS occasions in the each beam sweeping period are associated with SSBs corresponding to beams for transmission of the MBMS data in a manner of time domain first and then frequency domain.

In an alternative embodiment, the transmitting unit 1201 is further configured to transmit second configuration information to the terminal device, and the second configuration information is used for determining a number of time units includes in one MBMS occasion.

In an alternative embodiment, a time unit is a symbol or a slot.

In an alternative embodiment, the first configuration information is carried in a system broadcast message or an MCCH.

In an alternative embodiment, the network device includes a CU and at least one DU, and the first configuration information is transmitted by the CU to the at least one DU.

It is to be understood by those skilled in the art that the description of the apparatus for resource configuration described above in the embodiments of the present disclosure may be understood with reference to the description of the method for resource configuration in the embodiments of the present disclosure.

Figure 13:
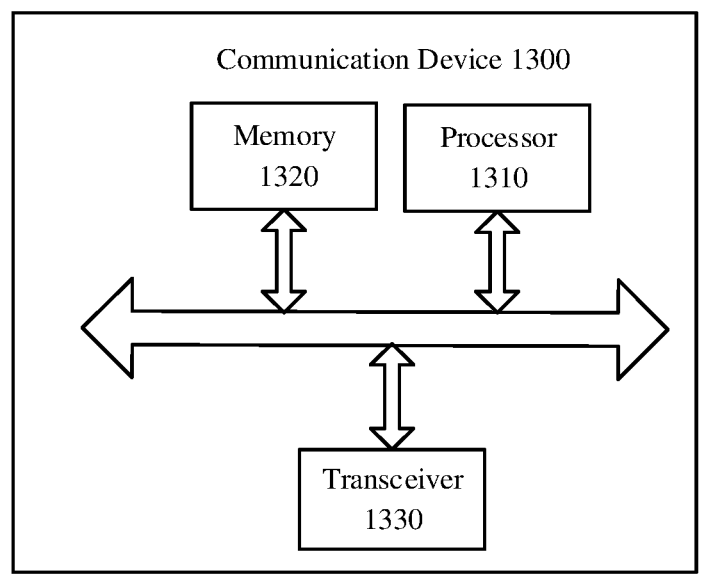
FIG. 13 is a schematic structural diagram of a communication device according to an embodiment of the present disclosure.

FIG. 13 is a schematic structural diagram of a communication device 1300 according to an embodiment of the present disclosure. The communication device may be the terminal device or the network device described in the above embodiments. The communication device 1300 illustrated in FIG. 13 includes a processor 1310. The processor 1310 may call a computer program from a memory and run the computer program to perform the method in the embodiments of the present disclosure.

In one example, as illustrated in FIG. 13, the communication device 1300 may also include a memory 1320. The processor 1310 may call a computer program from the memory 1320 and run the computer program to perform the method in the embodiments of the present disclosure.

The memory 1320 may be a separate device from the processor 1310, or may be integrated into the processor 1310.

In one example, as illustrated in FIG. 13, the communication device 1300 may also include a transceiver 1330. The processor 1310 may control the transceiver 1330 to communicate with another device, specifically, to transmit information or data to another device, or receive information or data from another device.

The transceiver 1330 may include a transmitter and a receiver. The transceiver 1330 may further include one or more antennas.

In one example, the communication device 1300 may specifically be the network device in the embodiments of the present disclosure. The communication device 1300 may implement a corresponding process implemented by the network device in each method of the embodiments of the present disclosure, which will not be elaborated herein for brief description.

In one example, the communication device 1300 may specifically be the mobile terminal/terminal device in the embodiments of the present disclosure. The communication device 1300 may implement a corresponding process implemented by the mobile terminal/terminal device in each method of the embodiments of the disclosure, which will not be elaborated herein for brief description.

Figure 14:
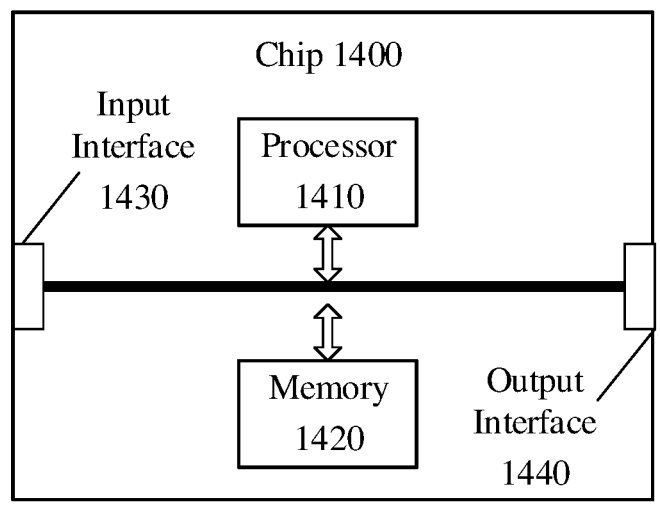
FIG. 14 is a schematic structural diagram of a chip according to an embodiment of the present disclosure.

FIG. 14 is a schematic structural diagram of a chip according to an embodiment of the present disclosure. The chip 1400 illustrated in FIG. 14 includes a processor 1410. The processor 1410 can call a computer program from a memory and run the computer program to perform the method in the embodiments of the present disclosure.

In one example, as illustrated in FIG. 14, the chip 1400 may also include a memory 1420. The processor 1410 may call a computer program from the memory 1420 and run the computer program to perform the method in the embodiments of the present disclosure.

The memory 1420 may be a separate device from the processor 1410, or may be integrated in the processor 1410.

In one example, the chip 1400 may also include an input interface 1430. The processor 1410 may control the input interface 1430 to communicate with another device or chip, and specifically, may acquire information or data transmitted by another device or chip.

In one example, the chip 1400 may also include an output interface 1440. The processor 1410 may control the output interface 1440 to communicate with another device or chip, and specifically, may output information or data to another device or chip.

In one example, the chip may be applied to the network device in the embodiments of the present disclosure. The chip may implement a corresponding process implemented by the network device in each method of the embodiments of the disclosure, which will not be elaborated herein for brief description.

In one example, the chip may be applied to the mobile terminal/terminal device in the embodiments of the present disclosure. The chip may implement a corresponding process implemented by the mobile terminal/terminal device in each method of the embodiments of the disclosure, which will not be elaborated herein for brief description.

It is to be understood that in the embodiments of the disclosure, the chip may also be referred to as a system level chip, a system chip, a chip system or a system-on-chip.

Figure 15:
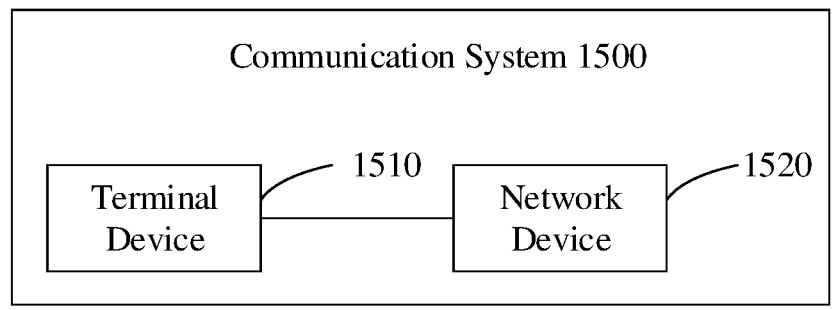
FIG. 15 is a schematic block diagram of a communication system according to an embodiment of the present disclosure.

FIG. 15 is a schematic block diagram of a communication system 1500 according to an embodiment of the present disclosure. As illustrated in FIG. 15, the communication system 1500 includes a terminal device 1510 and a network device 1520.

The terminal device 1510 may implement the corresponding functions implemented by the terminal device in the above methods, and the network device 1520 may implement the corresponding functions implemented by the network device in the above methods. Details will not be elaborated herein for brief description.

It is to be understood that in the embodiments of the disclosure, the processor may be an integrated circuit chip with a signal processing capability. In an implementation process, each operation of the method embodiments may be completed by an integrated logical circuit of hardware in the processor or instructions in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any related processor and the like. The operations of the methods disclosed in combination with the embodiments of the disclosure may be directly embodied to be executed and completed by a hardware decoding processor, or executed and completed by a combination of hardware and software modules in the decoding processor. The software module may be located in a mature storage medium in the art, such as a Random Access Memory (RAM), a flash memory, a Read-Only Memory (ROM), a Programmable ROM (PROM), an Electrically Erasable PROM (EEPROM) or a register. The storage medium is located in the memory. The processor reads information in the memory, and completes the operations of the above methods in combination with hardware of the processor.

It is to be understood that the memory in the embodiment of the disclosure may be a volatile memory or a non-volatile memory, or may include the volatile memory and the non-volatile memory. The non-volatile memory may be an ROM, a PROM, an Erasable PROM (EPROM), an EEPROM or a flash memory. The volatile memory may be an RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the system and the method described in the disclosure is intended to include but not limited to memories of these and any other suitable type.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include but not limited to memories of these and any other suitable type.

The embodiments of the disclosure also provide a computer-readable storage medium for storing one or more computer programs.

In one embodiment, the computer-readable storage medium may be applied in the network device of the embodiments of the disclosure. The computer programs may enable a computer to perform the corresponding process implemented by the network device in each method of the embodiments of the disclosure, which will not be elaborated herein for brief description.

In one example, the computer-readable storage medium may be applied in the mobile terminal/terminal device of the embodiments of the disclosure. The computer programs may enable a computer to perform the corresponding process implemented by the mobile terminal/terminal device in each method of the embodiments of the disclosure, which will not be elaborated herein for brief description.

The embodiments of the disclosure also provide a computer program product. The computer program product includes one or more computer program instructions.

In one embodiment, the computer program product may be applied in the network device of the embodiments of the disclosure. The computer program instructions may enable a computer to perform the corresponding process implemented by the network device in each method of the embodiments of the disclosure, which will not be elaborated herein for brief description.

In one example, the computer program product may be applied in the mobile terminal/terminal device of the embodiments of the disclosure. The computer program instructions may enable a computer to perform the corresponding process implemented by the mobile terminal/terminal device in each method of the embodiments of the disclosure, which will not be elaborated herein for brief description.

The embodiments of the disclosure also provide a computer program.

In one embodiment, the computer program may be applied in the network device of the embodiments of the disclosure. The computer program, when executed by a computer, enables the computer to perform the corresponding process implemented by the network device in each method of the embodiments of the disclosure, which will not be elaborated herein for brief description.

In one example, the computer program may be applied in the mobile terminal/terminal device of the embodiments of the disclosure. The computer program, when executed by a computer, enables the computer to perform the corresponding process implemented by the mobile terminal/terminal device in each method of the embodiments of the disclosure, which will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for resource configuration, comprising:
   receiving, by a terminal device, first configuration information from a network device, wherein the first configuration information is used for determining a radio resource configuration of a Multimedia Broadcast Multicast Service (MBMS),
   wherein when the first configuration information comprises configuration information of an MBMS Bandwidth Part (BWP), the configuration information of the MBMS BWP comprising frequency domain configuration information and time domain configuration information,
      wherein the frequency domain configuration information comprises at least one of a frequency domain position of the MBMS BWP or bandwidth information of the MBMS BWP; and the time domain configuration information comprises at least one of a period of the MBMS BWP or a duration of the MBMS BWP,
   wherein the MBMS BWP is capable of transmitting one or more MBMS data, and the MBMS BWP comprises one or more groups of MBMS occasions; and
   each group of MBMS occasions within the MBMS BWP correspond to transmission of a respective one of the one or more MBMS data, each MBMS occasion in the each group of MBMS occasions is associated with a respective beam for the transmission of the MBMS data, and each beam corresponds to a respective Synchronization Signal Block (SSB); or, each MBMS occasion in the each group of MBMS occasions is associated with a respective SSB index,
   wherein the each group of MBMS occasions comprises N MBMS occasions, N being a positive integer; and a i-th MBMS occasion of the N MBMS occasions is associated with a SSB index corresponding to a i-th beam for the transmission of the MBMS data, $1 \leq i \leq N$, i being a positive integer; and
   wherein a number of MBMS data capable of being transmitted within the MBMS BWP is configured through a system broadcast message or a Multicast Control Channel (MCCH).

2. The method of claim 1, wherein when the first configuration information comprises configuration information of an MBMS BWP, the configuration information of the MBMS BWP comprising frequency domain configuration information,
   wherein the frequency domain configuration information comprises at least one of a frequency domain position of the MBMS BWP or bandwidth information of the MBMS BWP.

3. The method of claim 2, wherein one of the following applies:
   the MBMS BWP comprises a plurality of MBMS windows in a time domain; and the first configuration information further comprises configuration information of an MBMS window, the configuration information of the MBMS window comprising at least one of: a period of the MBMS window, a duration of the MBMS window, or offset information of the MBMS window; or the MBMS BWP comprises a plurality of MBMS windows in a time domain, each of the plurality of MBMS windows corresponds to a respective radio frame.

4. The method of claim 3, wherein the MBMS window is capable of transmitting one or more MBMS data, and the MBMS window comprises one or more groups of MBMS occasions; and each group of MBMS occasions within the MBMS window correspond to transmission of a respective one of the one or more MBMS data, each MBMS occasion in the each group of MBMS occasions is associated with a respective beam for the transmission of the MBMS data, and each beam corresponds to a respective SSB; or, each MBMS occasion in the each group of MBMS occasions is associated with a respective SSB index.

5. The method of claim 4, wherein the each group of MBMS occasions comprises N MBMS occasions, N being a positive integer;

wherein a i-th MBMS occasion of the N MBMS occasions is associated with a SSB index associated with a i-th beam for the transmission of the MBMS data, 1≤i≤N, i being a positive integer; and wherein a number of MBMS data capable of being transmitted within the MBMS window is configured through a system broadcast message or an MCCH.

6. The method of claim 1, wherein when the first configuration information comprises configuration information of an MBMS occasion of an MBMS, the configuration information of the MBMS occasion comprising frequency domain configuration information and time domain configuration information;

wherein the frequency domain configuration information comprises at least one of: frequency domain resource positions of M MBMS occasions or a bandwidth of each of the M MBMS occasions, M being a positive integer; or, the frequency domain configuration information comprises at least one of: a number M of MBMS occasions comprised in a frequency domain, a start frequency domain position of a first MBMS occasion in the frequency domain, a bandwidth of the MBMS occasion, or a frequency domain interval between two adjacent MBMS occasions; and wherein the time domain configuration information is configured to determine N groups of MBMS occasions in a time domain, N being a positive integer.

7. The method of claim 6, wherein each beam sweeping period in the time domain is capable of transmitting a respective MBMS data, and the each beam sweeping period comprises one or more groups of MBMS occasions in the time domain, each group of MBMS occasions comprising M MBMS occasions in the frequency domain.

8. The method of claim 7, wherein the time domain configuration information is further used for determining a time interval between two adjacent groups of MBMS occasions responsive to the each beam sweeping period comprising a plurality of groups of MBMS occasions in the time domain; and wherein one of the following applies:

MBMS occasions in the each beam sweeping period are associated with SSBs corresponding to beams for transmission of the MBMS data in a manner of first frequency domain and then time domain; or MBMS occasions in the each beam sweeping period are associated with SSBs corresponding to beams for transmission of the MBMS data in a manner of time domain first and then frequency domain.

9. The method of claim 1, further comprising:

receiving, by the terminal device, second configuration information from the network device, wherein the second configuration information is used for determining a number of time units comprised in one MBMS occasion, a time unit being a symbol or a slot.

10. The method of claim 1, wherein the first configuration information is carried in a system broadcast message or an MCCH; and wherein the network device comprises a Central Unit (CU) and at least one Distribution Unit (DU), and the first configuration information is transmitted by the CU to the at least one DU.

11. A terminal device, comprising:

a transceiver, configured to receive first configuration information from a network device, wherein the first configuration information is used for determining a radio resource configuration of a Multimedia Broadcast Multicast Service (MBMS), wherein when the first configuration information comprises configuration information of an MBMS Bandwidth Part (BWP), the configuration information of the MBMS BWP comprising frequency domain configuration information and time domain configuration information, wherein the frequency domain configuration information comprises at least one of a frequency domain position of the MBMS BWP or bandwidth information of the MBMS BWP; and the time domain configuration information comprises at least one of a period of the MBMS BWP or a duration of the MBMS BWP, wherein the MBMS BWP is capable of transmitting one or more MBMS data, and the MBMS BWP comprises one or more groups of MBMS occasions; and each group of MBMS occasions within the MBMS BWP correspond to transmission of a respective one of the one or more MBMS data, each MBMS occasion in the each group of MBMS occasions is associated with a respective beam for the transmission of the MBMS data, and each beam corresponds to a respective Synchronization Signal Block (SSB); or, each MBMS occasion in the each group of MBMS occasions is associated with a respective SSB index, wherein the each group of MBMS occasions comprises N MBMS occasions, N being a positive integer; and a i-th MBMS occasion of the N MBMS occasions is associated with a SSB index corresponding to a i-th beam for the transmission of the MBMS data, 1≤i≤N, i being a positive integer; and wherein a number of MBMS data capable of being transmitted within the MBMS BWP is configured through a system broadcast message or a Multicast Control Channel (MCCH).

12. The terminal device of claim 11, wherein when the first configuration information comprises configuration information of an MBMS BWP, the configuration information of the MBMS BWP comprising frequency domain configuration information, wherein the frequency domain configuration information comprises at least one of a frequency domain position of the MBMS BWP or bandwidth information of the MBMS BWP.

13. The terminal device of claim 11, wherein when the first configuration information comprises configuration information of an MBMS occasion of an MBMS, the configuration information of the MBMS occasion comprising frequency domain configuration information and time domain configuration information;

wherein the frequency domain configuration information comprises at least one of: frequency domain resource positions of M MBMS occasions or a bandwidth of each of the M MBMS occasions, M being a positive integer; or, the frequency domain configuration information comprises at least one of: a number M of MBMS occasions comprised in a frequency domain, a start frequency domain position of a first MBMS occasion in the frequency domain, a bandwidth of the MBMS occasion, or a frequency domain interval between two adjacent MBMS occasions; and wherein the time domain configuration information is configured to determine N groups of MBMS occasions in a time domain, N being a positive integer.

14. The terminal device of claim 11, wherein the first configuration information is carried in a system broadcast message or an MCCH; and wherein the network device comprises a Central Unit (CU) and at least one Distribution Unit (DU), and the first configuration information is transmitted by the CU to the at least one DU.

15. A non-transitory computer readable storage medium having stored therein a computer program that, when executed by a processor, causes the processor to perform operations comprising:

receiving first configuration information from a network device, wherein the first configuration information is used for determining a radio resource configuration of a Multimedia Broadcast Multicast Service (MBMS), wherein when the first configuration information comprises configuration information of an MBMS Bandwidth Part (BWP), the configuration information of the MBMS BWP comprising frequency domain configuration information and time domain configuration information, wherein the frequency domain configuration information comprises at least one of a frequency domain position of the MBMS BWP or bandwidth information of the MBMS BWP; and the time domain configuration information comprises at least one of a period of the MBMS BWP or a duration of the MBMS BWP, wherein the MBMS BWP is capable of transmitting one or more MBMS data, and the MBMS BWP comprises one or more groups of MBMS occasions; and each group of MBMS occasions within the MBMS BWP correspond to transmission of a respective one of the one or more MBMS data, each MBMS occasion in the each group of MBMS occasions is associated with a respective beam for the transmission of the MBMS data, and each beam corresponds to a respective Synchronization Signal Block (SSB); or, each MBMS occasion in the each group of MBMS occasions is associated with a respective SSB index, wherein the each group of MBMS occasions comprises N MBMS occasions, N being a positive integer; and a i-th MBMS occasion of the N MBMS occasions is associated with a SSB index corresponding to a i-th beam for the transmission of the MBMS data, $1 \leq i \leq N$, i being a positive integer; and wherein a number of MBMS data capable of being transmitted within the MBMS BWP is configured through a system broadcast message or a Multicast Control Channel (MCCH).

16. The terminal device of claim 11, wherein the transceiver is further configured to receive second configuration information from the network device, wherein the second configuration information is used for determining a number of time units comprised in one MBMS occasion, a time unit being a symbol or a slot.

17. The non-transitory computer readable storage medium of claim 15, wherein the processor further performs operations:

receiving second configuration information from the network device, wherein the second configuration information is used for determining a number of time units comprised in one MBMS occasion, a time unit being a symbol or a slot.

18. The non-transitory computer readable storage medium of claim 15, wherein the first configuration information is carried in a system broadcast message or an MCCH; and wherein the network device comprises a Central Unit (CU) and at least one Distribution Unit (DU), and the first configuration information is transmitted by the CU to the at least one DU.

* * * * *